(12) United States Patent
Sorice

(10) Patent No.: US 12,214,726 B2
(45) Date of Patent: Feb. 4, 2025

(54) REAR VIEW MIRROR FOR VEHICLE

(71) Applicant: LUMATECH S.R.L., Carugate (IT)

(72) Inventor: Luigi Maria Sorice, Carugate (IT)

(73) Assignee: LUMATECH S.R.L., Carugate (IT)

( * ) Notice: Subject to any disclaimer, the term of this patent is extended or adjusted under 35 U.S.C. 154(b) by 483 days.

(21) Appl. No.: 17/601,448

(22) PCT Filed: May 12, 2020

(86) PCT No.: PCT/IB2020/054467
§ 371 (c)(1),
(2) Date: Oct. 5, 2021

(87) PCT Pub. No.: WO2020/230014
PCT Pub. Date: Nov. 19, 2020

(65) Prior Publication Data
US 2022/0176879 A1    Jun. 9, 2022

(30) Foreign Application Priority Data

May 14, 2019  (IT) .......................... 102019000006822

(51) Int. Cl.
*B60R 1/07* (2006.01)
(52) U.S. Cl.
CPC ...................... *B60R 1/07* (2013.01)
(58) Field of Classification Search
CPC .... B60R 1/07; B60R 1/00; B60R 1/02; B60R 1/06; B60R 1/072; B60R 1/025; B60R 1/08; B60Y 2200/11
USPC ......................................................... 359/873
See application file for complete search history.

(56) References Cited

U.S. PATENT DOCUMENTS

| | | | |
|---|---|---|---|
| 2005/0141115 A1* | 6/2005 | Foote | B60R 1/074 359/879 |
| 2015/0097955 A1* | 4/2015 | De Wind | B60R 1/12 359/872 |
| 2018/0086272 A1 | 3/2018 | De Wind et al. | |

FOREIGN PATENT DOCUMENTS

| | | |
|---|---|---|
| CN | 1422767 A | 6/2003 |
| CN | 1718479 A | 1/2006 |
| JP | H10236231 A | 9/1998 |
| WO | WO-2013126719 A2 | 8/2013 |

OTHER PUBLICATIONS

International Search Report issued Aug. 18, 2020 in PCT/IB2020/054467, 3 pages.
Written Opinion issued Aug. 18, 2020 in PCT/IB2020/054467, 5 pages.
Combined Chinese Office Action and Search Report issued May 25, 2024 in corresponding Chinese Patent Application No. 202080024796.8 (with English translation), 19 pages.

* cited by examiner

*Primary Examiner* — Tuyen Tra
*Assistant Examiner* — Rahman Abdur
(74) *Attorney, Agent, or Firm* — Element IP, PLC

(57) ABSTRACT

Rear-view device for a vehicle comprising a support arm adapted to be securely mounted with said vehicle, a casing rotatably mounted with said support arm, and a mirror securely mounted with said casing. The casing rotates around a first geometric axis, to a second geometric axis and to a third geometric axis switching from a plurality of angular positions with respect to the support arm.

12 Claims, 11 Drawing Sheets

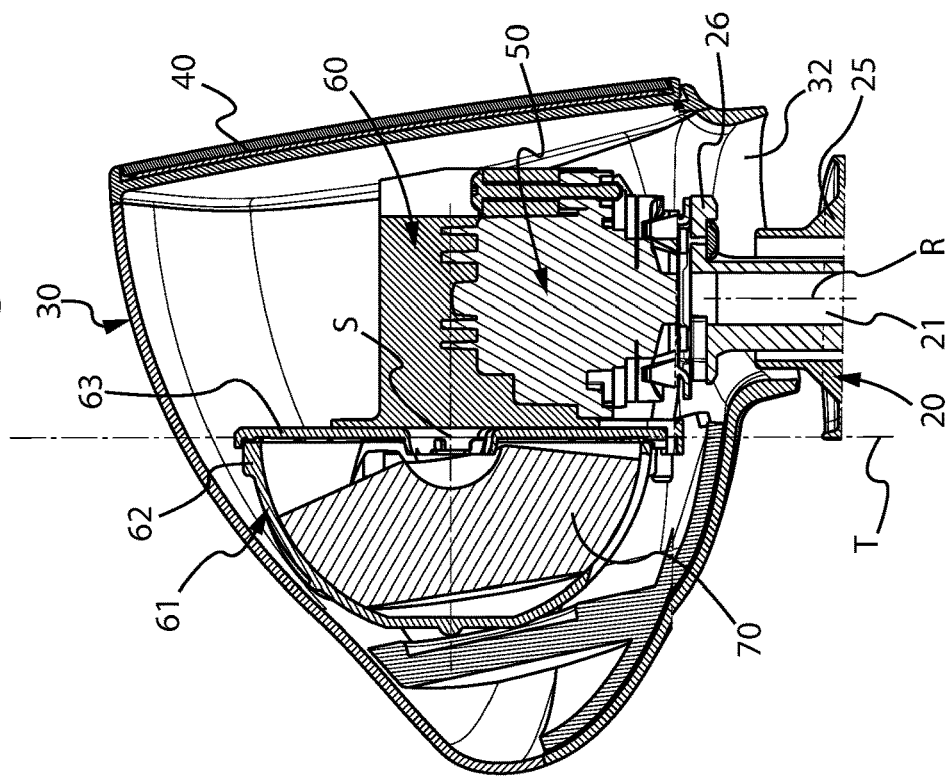
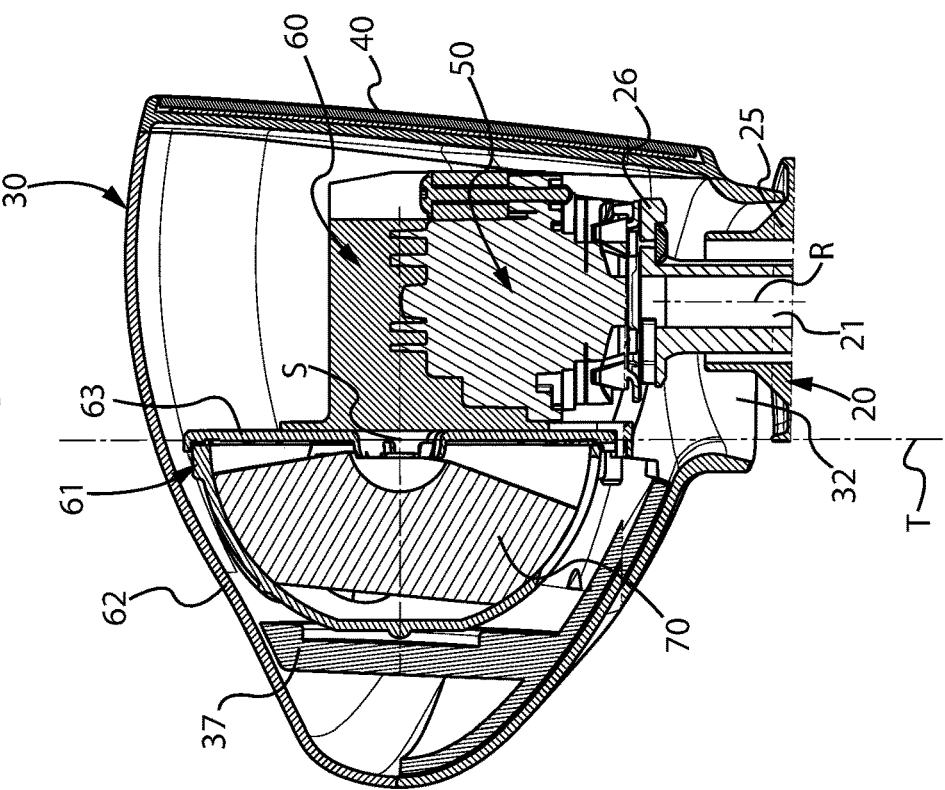

REAR VIEW MIRROR FOR VEHICLE

The present invention relates to a rear-view mirror for a vehicle.

In the state of the art, rear-view mirrors for cars or motorcycles are known. Known rear-view mirrors comprise an arm for the attachment to a car, a cover casing rotatably mounted with the attachment arm and a mirror rotatably mounted with the cover casing, a first electric motor securely mounted with the attachment arm which allows the rotation of the casing around a vertical geometric rotation axis to switch the rear-view mirror casing from an operating position to an overturned position where the casing is folded away towards a frame of the motor vehicle so as to occupy a smaller overall dimension, a second electric motor securely mounted with the cover casing that allows a rotation of the mirror around two geometric rotation axes to adjust the rear view of a driver of the motor vehicle. The mirror is rotatably mounted with the casing and the casing is rotatably mounted with the arm of the vehicle rear-view mirror.

Disadvantageously, the known rear-view mirror has a considerable volumetric overall dimension due to the need of having to ensure that a mirror is large enough to allow a complete view of a field of vision as required by the Traffic Code.

Disadvantageously, the considerable overall dimension of the rear-view mirror negatively affects an aerodynamic shape of the motor vehicle, lowering its performance and making the fuel consumption higher.

Disadvantageously a rotation mechanism of the mirror on two axes is exposed to impacts and tampering making the rear-view mirror fragile.

The object of the present invention consists in providing a more compact, safe, solid, more protected rear-view mirror, less prone to breakage, which allows a driver of a motor vehicle a complete view of a field of vision, which allows greater aerodynamics of the motor vehicle and therefore allows a lower fuel consumption or a better performance of the vehicle, which solves the disadvantages of the prior art.

According to the invention, this object is achieved with a rear-view mirror for a vehicle according to claim 1.

Other features are envisaged in the dependent claims.

The features and advantages of the present invention will be more apparent from the following description, which is to be understood as exemplifying and not limiting, with reference to the appended schematic drawings, wherein.

Figure 1:
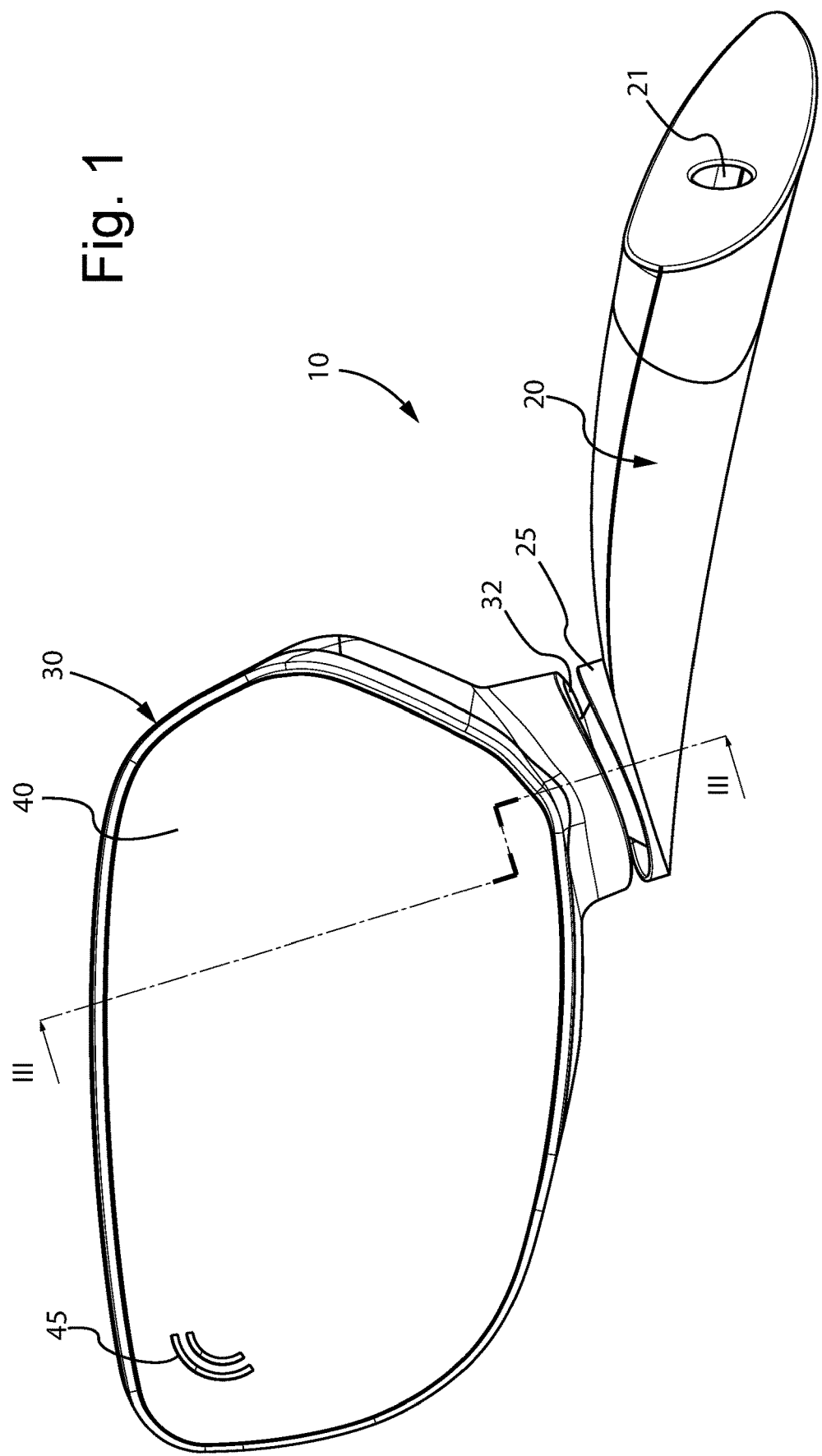
FIG. 1 is a front plan view of a rear-view mirror for vehicles according to the present invention comprising an arm for the attachment with a vehicle, a casing and a mirror.
Figure 2:
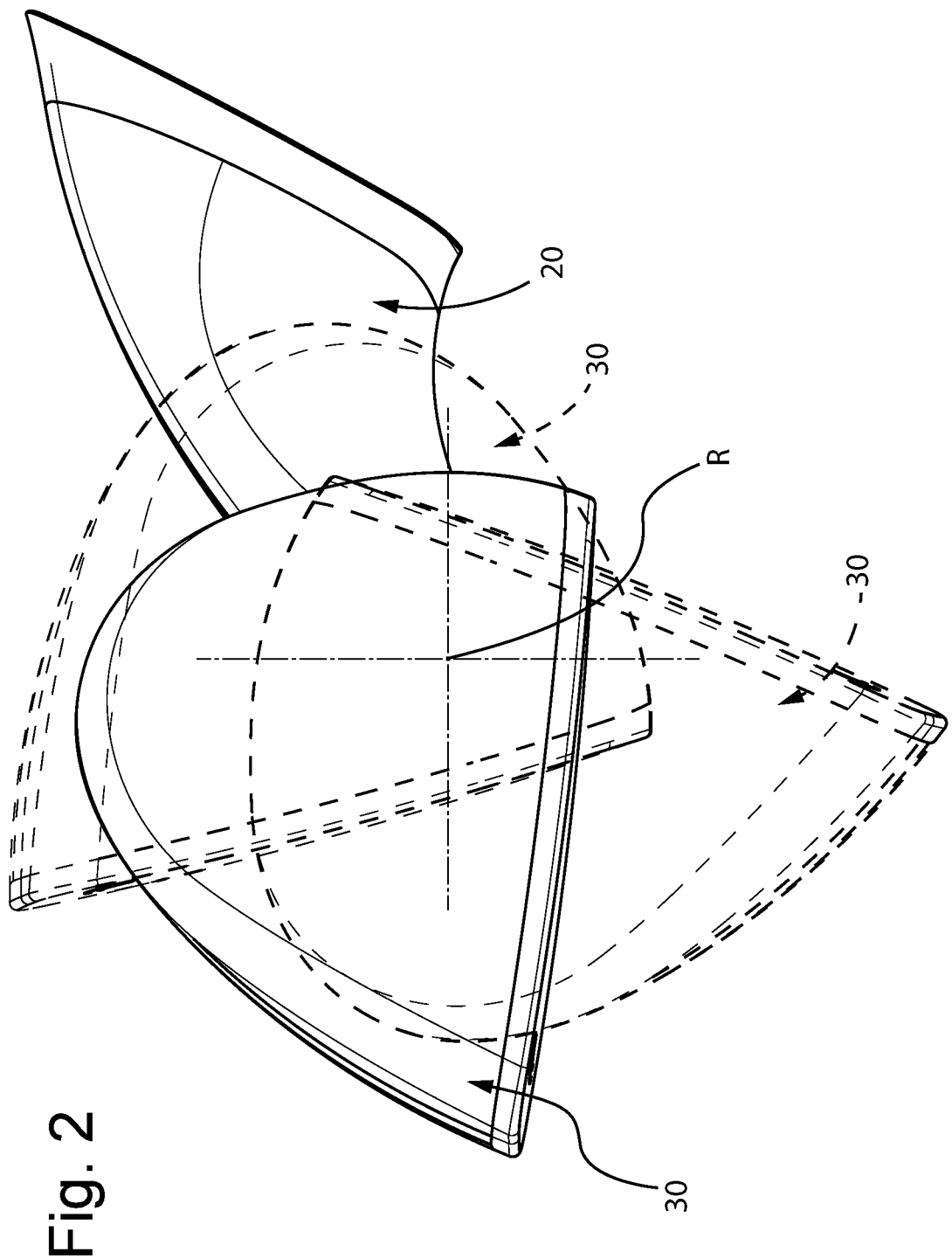
FIG. 2 is a top plan view of the rear-view mirror where the casing is shown in three different angular positions to the arm for the attachment to the vehicle where the casing rotates around a first geometric rotation axis.
Figure 3:
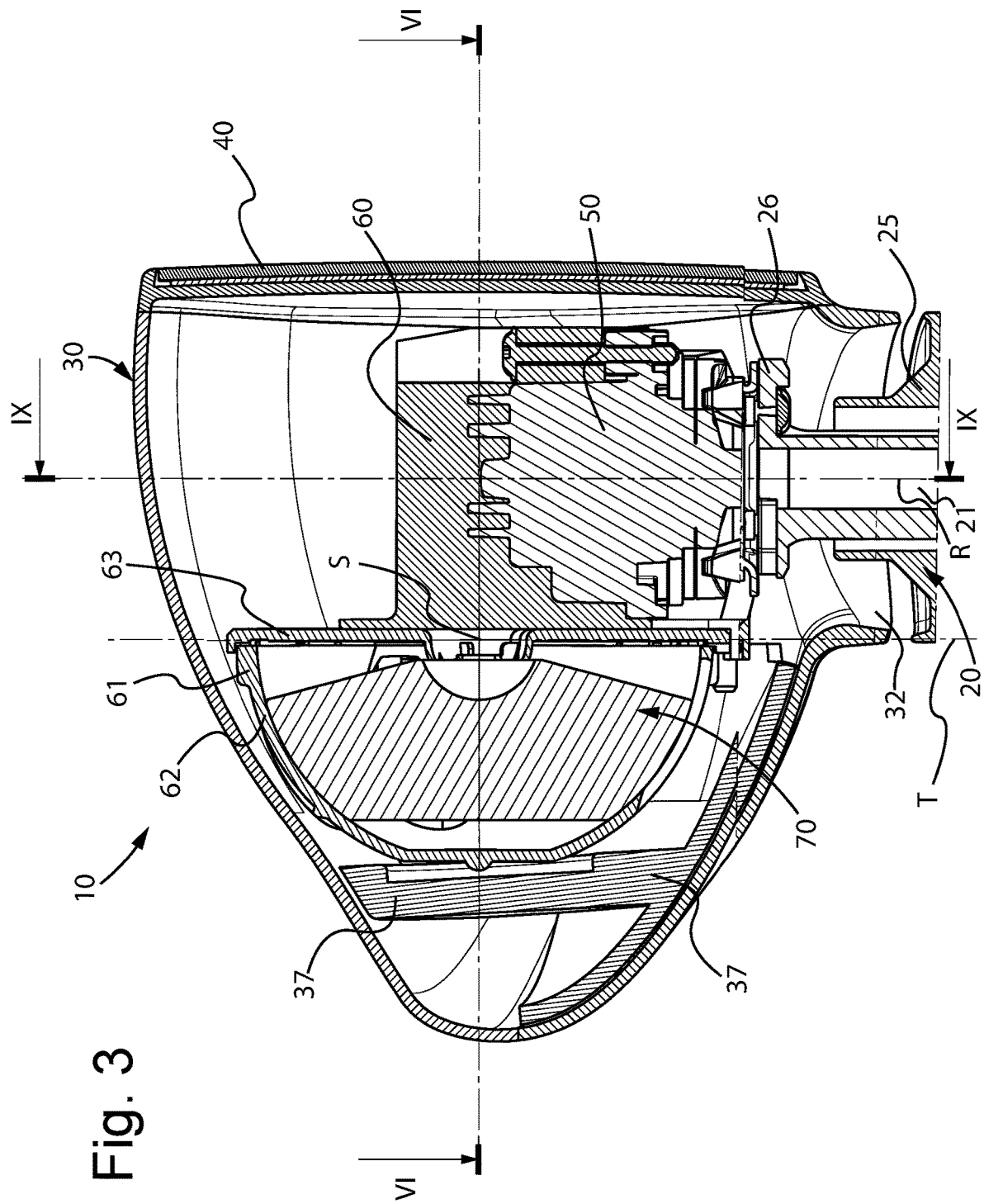
Figure 6:
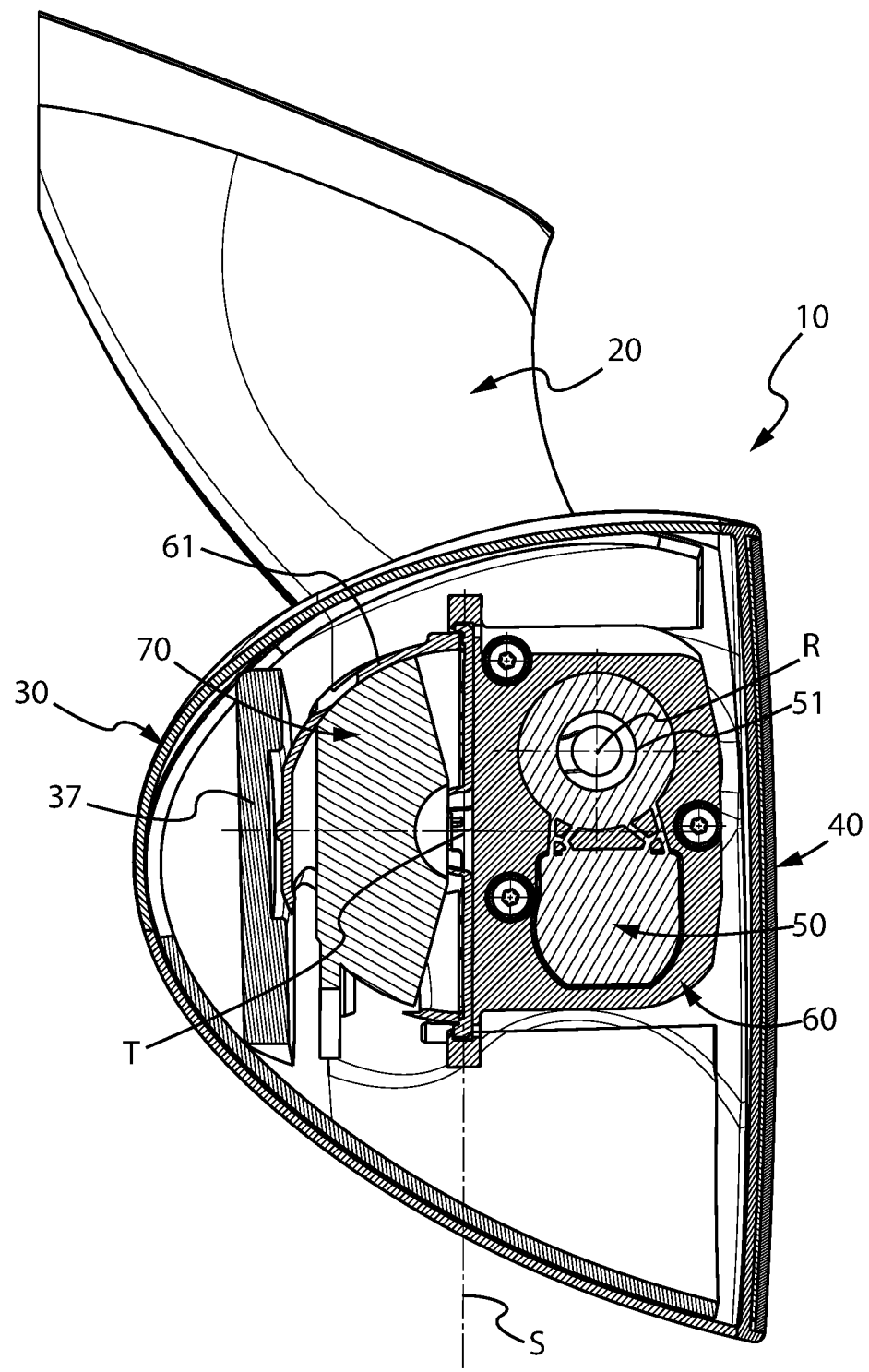
Figure 7:
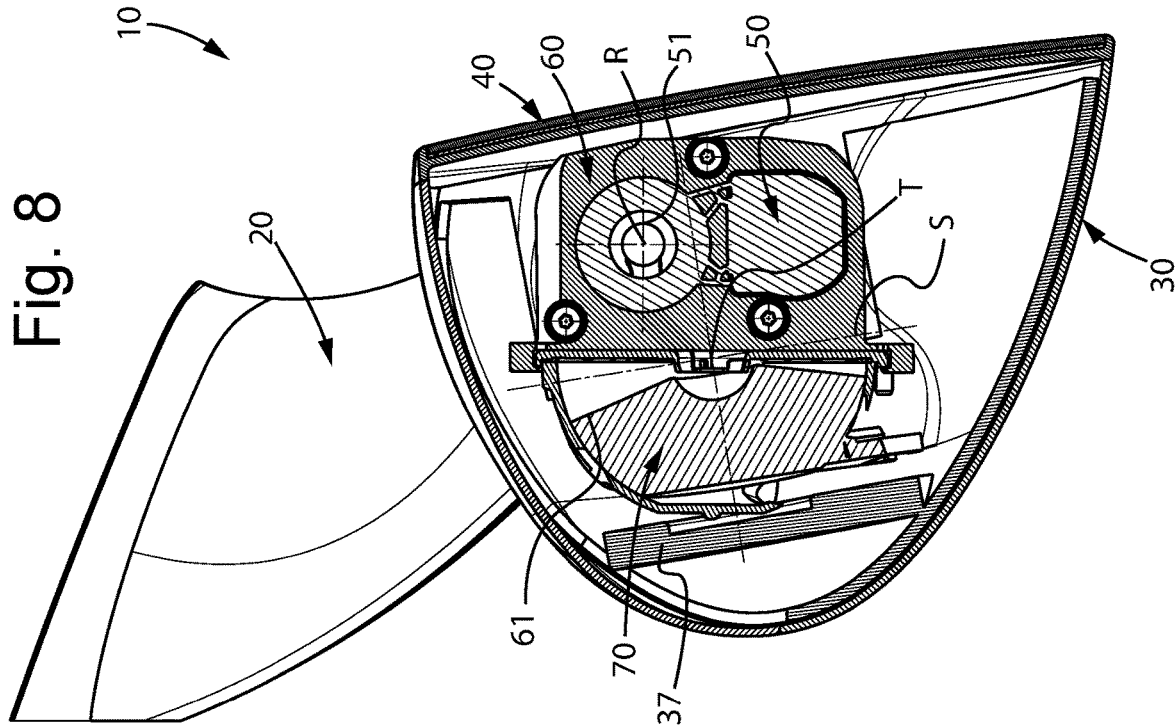
Figure 8:
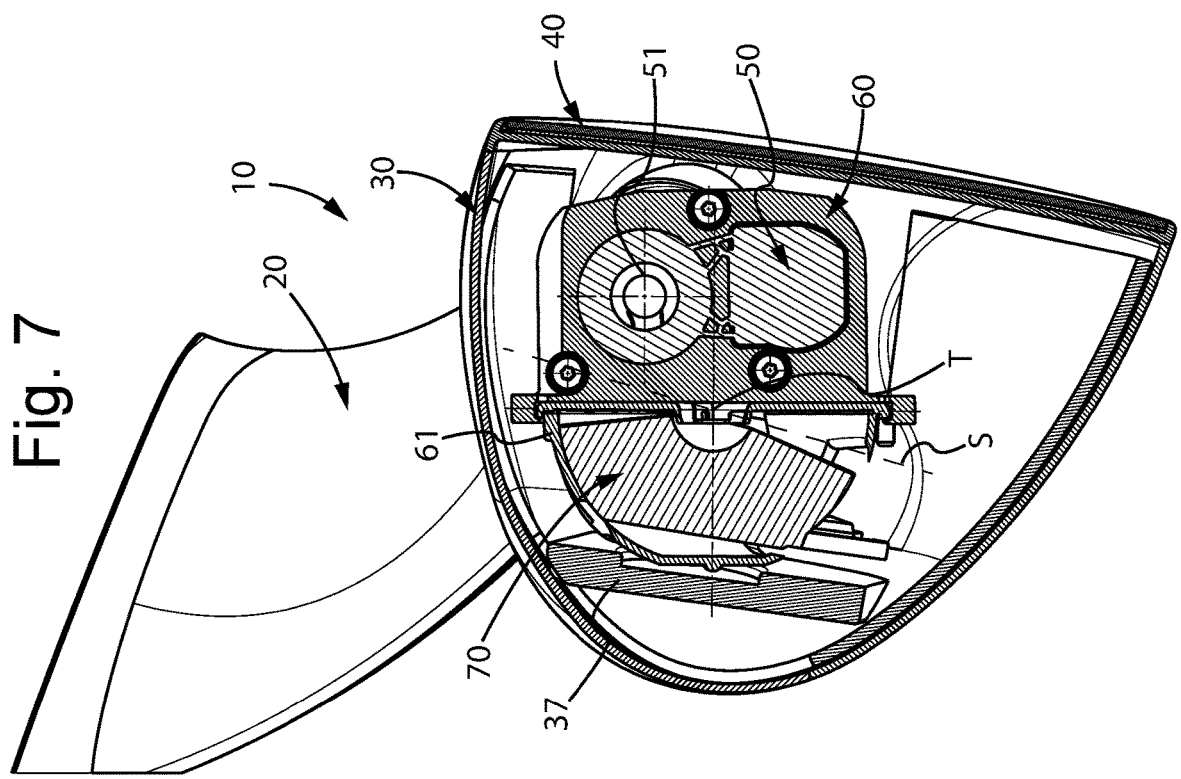
Figure 9:
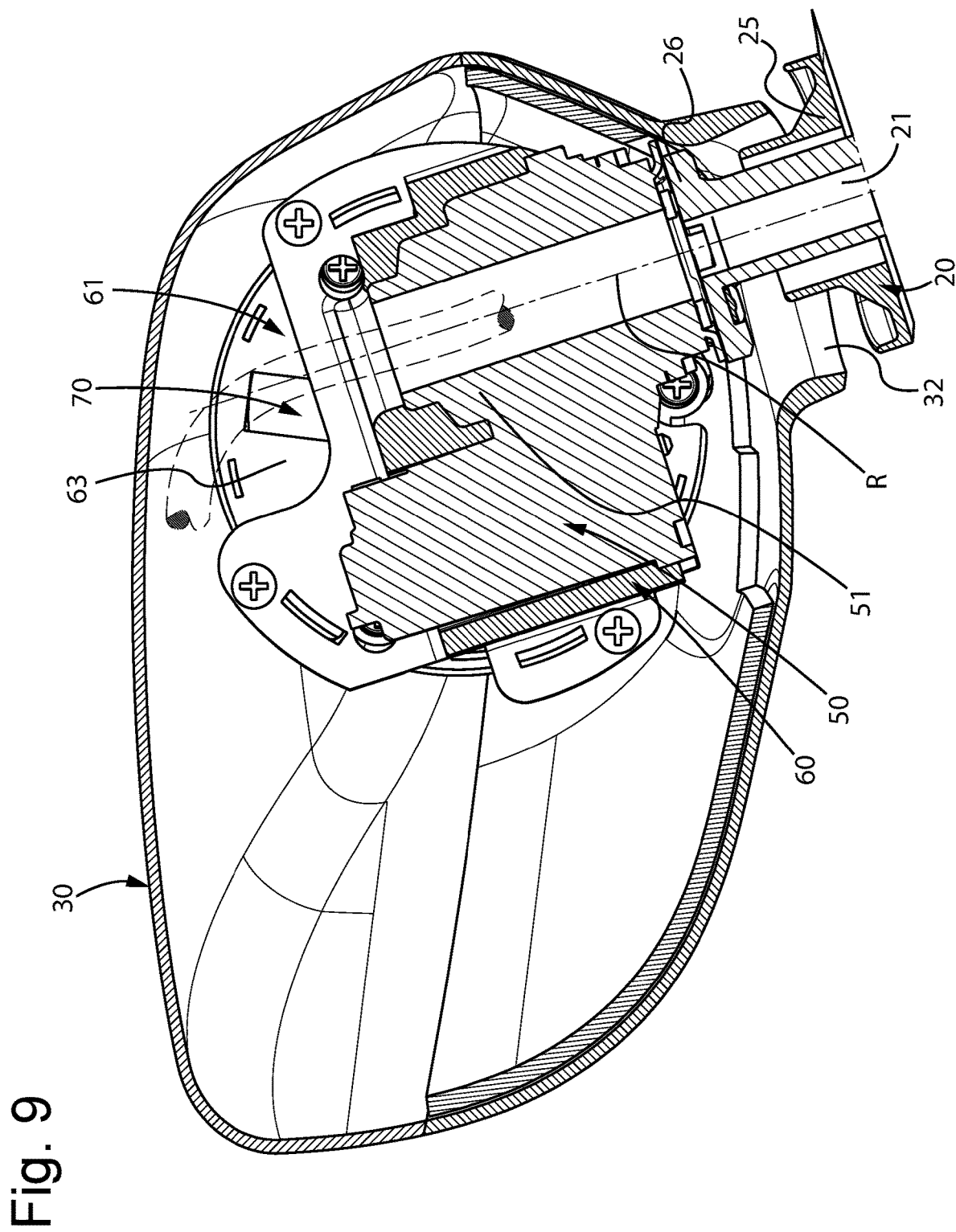
Figure 10:
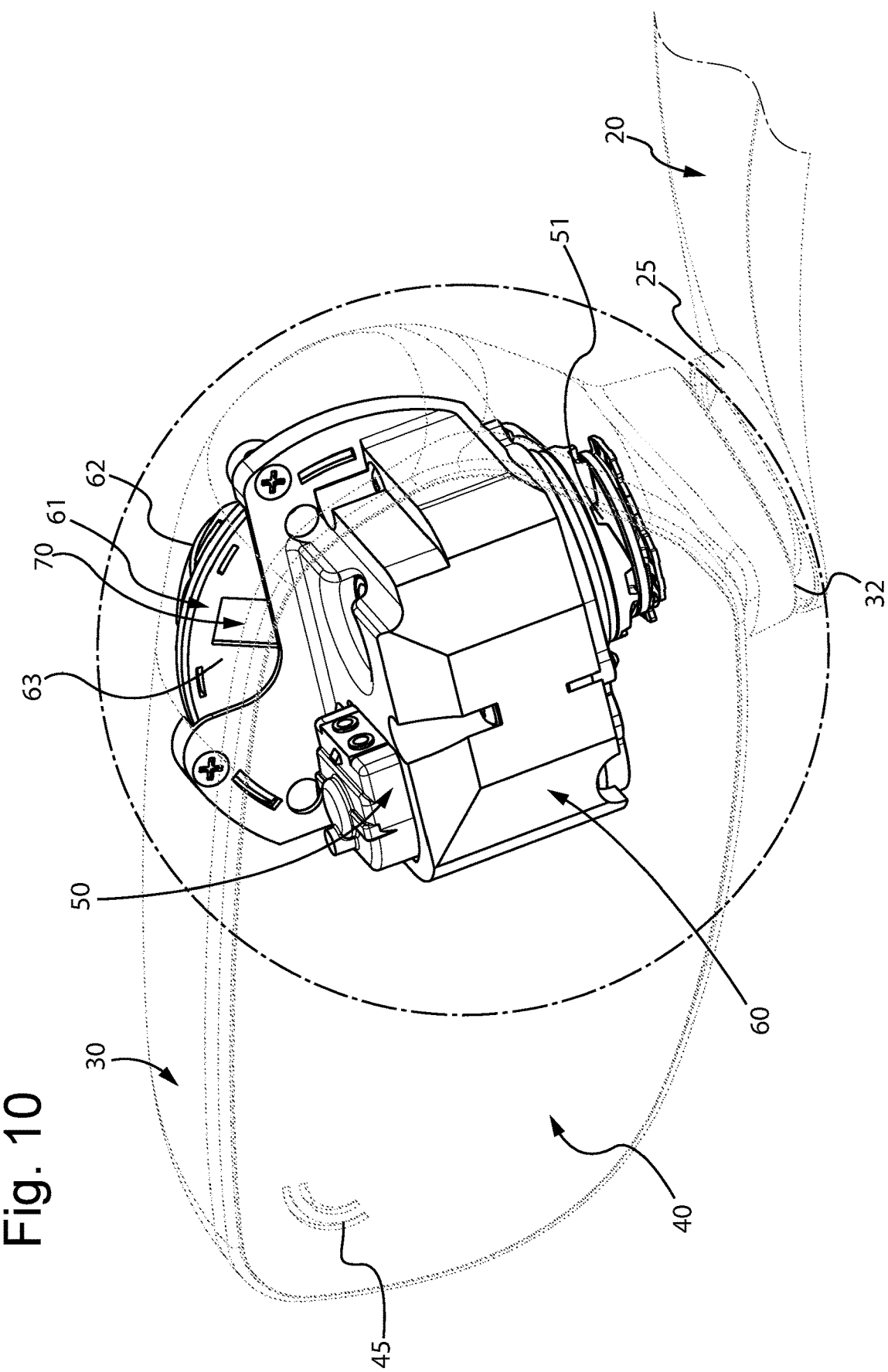
Figure 11:
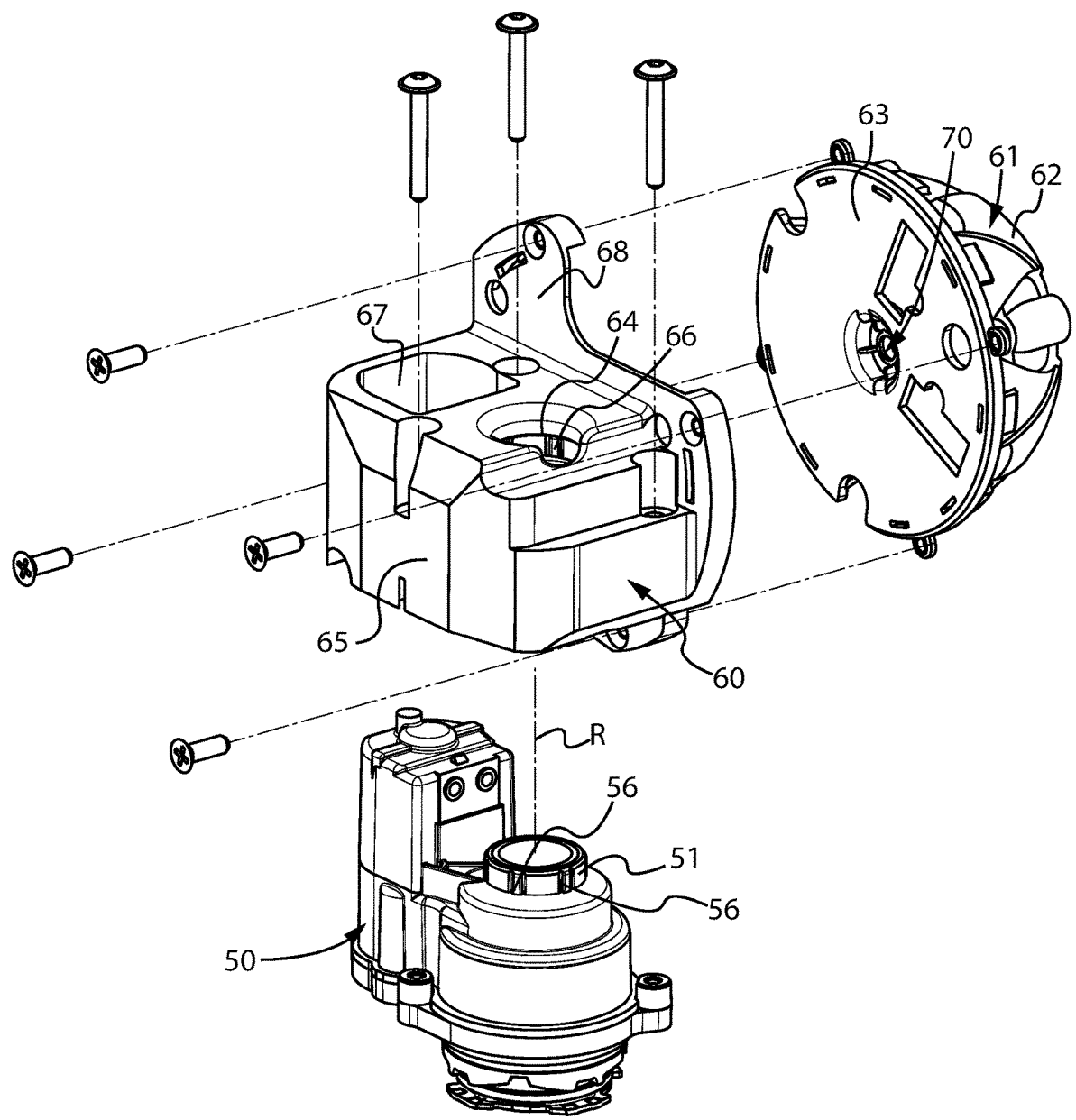
Figure 12:
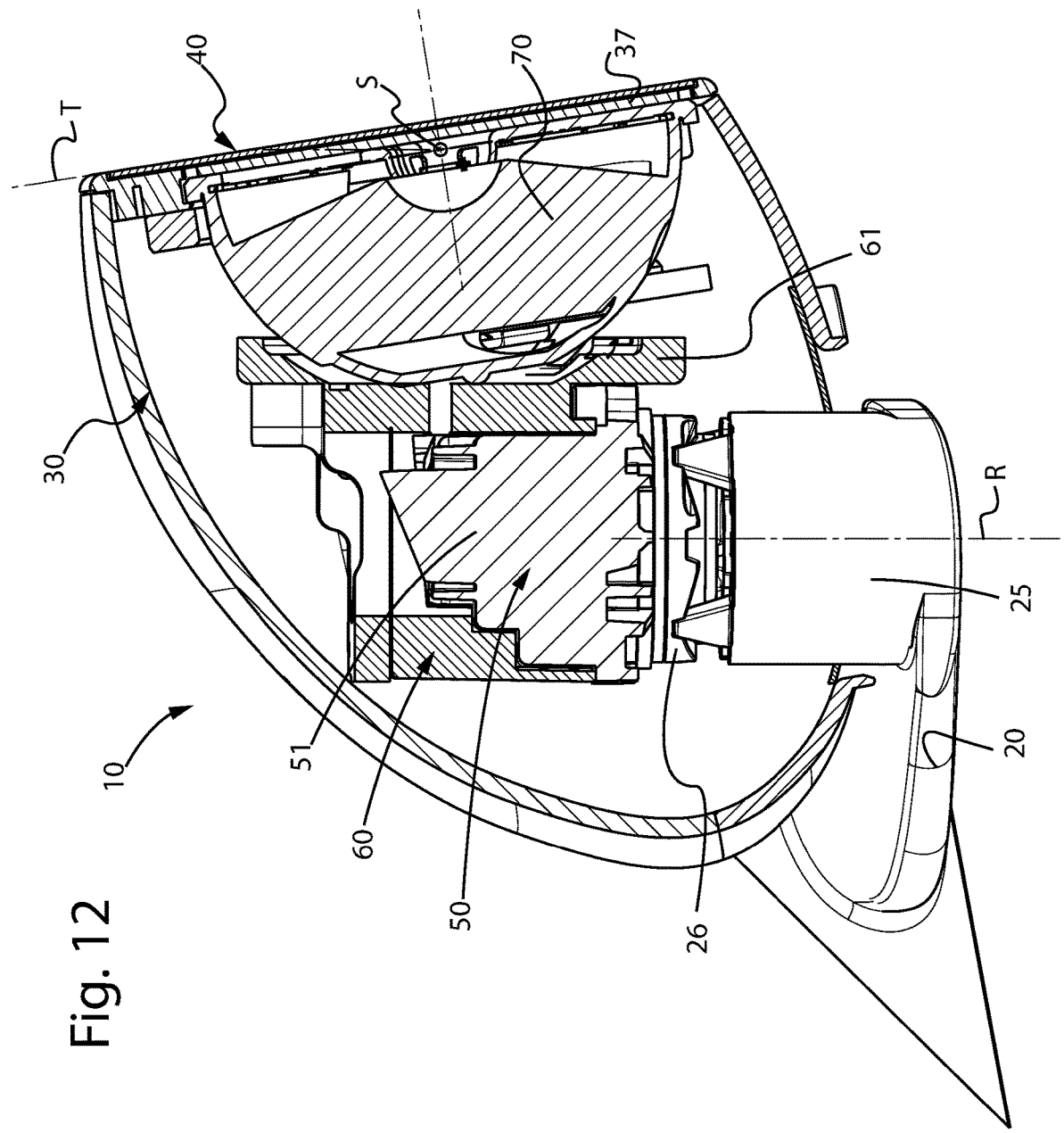
Figure 13:
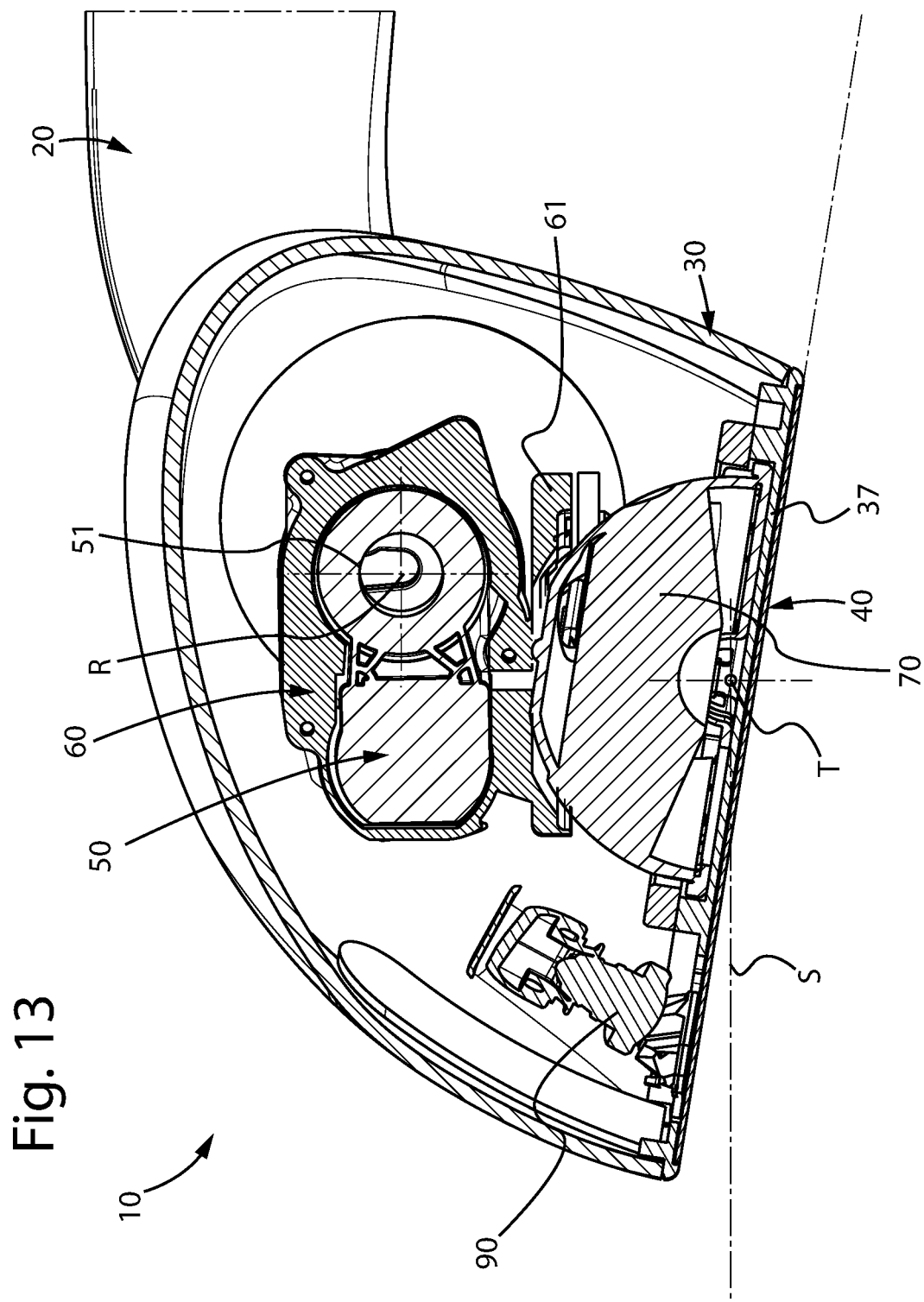

FIG. 3 is a section view according to the line III-III of FIG. 1 and shows a first angular position of the casing, a first electric motor securely mounted on a base support of the arm for the attachment to the vehicle, the first electric motor comprises a spindle, a support frame is mounted with the spindle, the support frame rotates around the first geometric axis which is perpendicular to the base support, a second electric motor is mounted with the support frame, the second electric motor comprises an actuator which is mounted with a casing support, the actuator allows to move the casing support around two geometric axes perpendicular to each other, the mirror is securely mounted with the casing;

FIG. 4 is a section view according to the line II-III of FIG. 1 and shows a second angular position of the casing which orients the mirror downwards;

FIG. 5 is a section view according to the line II-III of FIG. 1 and shows a third angular position of the casing which orients the mirror upwards;

FIG. 6 shows a section view according to the line VI-VI of FIG. 3 and shows a fourth angular position of the casing which orients the mirror towards a rear side of a vehicle;

FIG. 7 shows a section view according to the line VI-VI of FIG. 3 and shows a fifth angular position of the casing which orients the mirror towards an external direction with respect to a vehicle frame;

FIG. 8 shows a section view according to the line VI-VI of FIG. 3 and shows a sixth angular position of the casing which orients the mirror towards an internal direction towards the vehicle frame;

FIG. 9 shows a section view according to the line IX-IX of FIG. 3 and shows a hollow channel inside the support arm, of the first electric motor and of the support frame for the passage of electric cables between the vehicle and the rear-view mirror for the operation of the two electric motors;

FIG. 10 shows an axonometric perspective view which shows in particular a rotation mechanism on three axes of the casing comprising the first electric motor, the support frame, the second electric motor which comprises the actuator and the casing support mounted with the casing;

FIG. 11 shows an exploded axonometric perspective view of the rotation mechanism on three axes of the casing;

FIG. 12 shows a section view according to the line III-III of FIG. 1 of an alternative rear-view mirror where the casing support is mounted with the mirror and the mirror is securely mounted with the casing;

FIG. 13 shows a section view according to the line IX-IX of FIG. 3 of the alternative rear-view mirror which also shows a camera mounted inside the casing at a portion of a semi-transparent mirror.

With reference to the aforementioned figures, a rear-view device 10 for a vehicle is shown which comprises a support arm 20 adapted to be securely mounted with said vehicle, a casing 30 rotatably mounted with said support arm 20, and a mirror 40 securely mounted with said casing 30.

The rear-view device 10 comprises a first electric motor 50 securely mounted with said support arm 20. Said first electric motor 50 comprises a spindle 51 adapted to rotate around a first geometric axis R with respect to said support arm 20.

The rear-view device 10 comprises a support frame 60 which is securely mounted with said spindle 51. Said support frame rotates around said first geometric axis R switching from at least a first angular position to at least a second angular position as shown in particular in FIGS. 6-8.

The rear-view device 10 comprises an actuator 70 which is mounted with said support frame 60. The actuator is electrically connected with the first electric motor 50 or alternatively it is electrically connected with a second electric motor which is not shown in the figures.

Said actuator 70 is securely mounted over a portion with said casing 30 and said actuator 70 is adapted to rotate around a second geometric axis S and a third geometric axis T, where said second geometric axis S is perpendicular with said third geometric axis T.

The actuator 70 moves together with the support frame 60.

Said casing 30 rotates around said first geometric axis R, to said second geometric axis S and to said third geometric axis T switching from a plurality of angular positions with respect to said support arm 20 as shown in particular in FIGS. 3-8.

The casing 30 contains and protects a rotation mechanism comprising the first electric motor 50 and the actuator 70.

Said actuator 70 is securely mounted with a support 37 of said casing 30, where said support 37 is securely mounted with said casing 30.

The support 37 of the casing 30 is mounted inside the casing 30 in the direction of a forward direction of travel of the vehicle.

Said support frame 60 comprises a support 61. Said actuator 70 is rotatably mounted with said support 61 of said support frame 60 in such a way as to rotate both around said second geometric axis S and around said third geometric axis T.

As shown in particular in FIG. 11, said support 61 for said actuator 70 comprises a hemispherical portion 62 and a base portion 63. Said hemispherical portion 62 comprises at least a through opening adapted to allow an engagement in a secure manner between said actuator 70 and said support 37 of the casing 30. Said base portion 63 comprises a flat wall adapted to be securely mounted with a main body 65 of said support frame 60 comprises a portion comprising elements with shapes 68 complementary to said base portion 63 of the support 61 so that they are securely mountable between them.

The base portion 63 and the complementary portions of the main body 65 of the support frame 60 are directed in the forward direction of the vehicle, in the opposite direction with respect to the mirror 40.

The main body 65 of the support frame 60 comprises at least one through opening 64 to allow the entry of said spindle 51 of the first electric motor 50. The through opening 64 comprises at least one engagement element 66 with a shape complementary to a respective at least one engagement element 56 of said spindle 51, so that the spindle 51 and the support frame 60 rotate integrally with respect to the support arm 20.

The main body 65 of the support frame 60 comprises a housing 67 for housing said first electric motor 50.

Said support 61 of said support frame 60 is advantageously mounted in the opposite direction with respect to said mirror 40, i.e. in the direction of the motion direction of the vehicle, so as to be more protected from violation attempts or impacts.

As shown in particular in FIGS. 3-6, 9, said support arm 20 comprises a base support 26. Said first electric motor 50 is securely mounted above said base support 26. Said first geometric axis R is perpendicular to the base support 26.

Said support arm 20 comprises a base 25 adapted to the assembly of said casing 30, a rod 27 comprising a lower portion securely mounted with said base 25 and a top portion forming said base support 26. The base support 26 is flat to allow a fixed engagement with said first electric motor 50.

Preferably, as shown in FIGS. 3-5, said third geometric axis T is parallel to said first geometric axis R.

Alternatively, it is possible that said third geometric axis T is perpendicular to the ground and that the first geometric axis R is perpendicular to the base support 26 as shown in FIG. 9.

Said casing 30 comprises a lower portion comprising a through opening 32 which allows the entry of the rod 27 and has a sufficient width to avoid interfering with the rod 27 during the rotation of the casing 30 on said three geometric axes R, S, T.

As shown in particular in FIGS. 1, 3-5, 9, the support arm 20 comprises a cavity 21 hollowed in a body of the support arm 20 which allows the insertion of electric cables electrically connected to the vehicle. The support base 25 comprises a through opening in communication with the cavity 21 of the support arm 20 for the passage of the electric cables. The electric cables are electrically connected to said first electric motor 50 and to the actuator 70.

Advantageously, the rear-view device 10 of the present invention is more compact, safer, more solid, more protected, less prone to breakage, allows a driver of a motor vehicle a complete view of a field of vision, allowing to choose a shape of the support arm 20 and of the casing 30 which allows greater aerodynamics of the vehicle and therefore allows lower fuel consumption and/or better performance of the vehicle, solving the disadvantages of the prior art.

Advantageously, the casing 30 can be smaller since the mirror 40 is fixed with the casing 30 and the rotation mechanism 50, 70 of the casing 30 on the three axes R, S, T is smaller.

Advantageously, the whole rotation mechanism 50, 70 is inside the casing 30 and the only through opening 32 faces downwards to allow the rod 27 of the support arm 20 to pass.

Advantageously, the whole rotation mechanism 50, 70 is inside the casing 30 and prevents tampering with a screwdriver and/or levers to detach the casing 30.

Advantageously, the mirror 40 is engaged with the casing 30 and not directly with the rotation mechanism 50, 70, this fact allows obtaining a more solid, safe and resistant rear-view device 10.

Alternatively, it is possible to provide that the actuator 70 is mounted in the direction of the mirror 40 as shown in FIGS. 12 and 13. In this alternative, the support 61 of the support frame 60 comprises a mounting cavity for mounting said actuator 70. In this alternative the third rotation axis T rotates with respect to the first rotation axis R as shown in particular in FIG. 12.

Alternatively, it is provided that the mirror 40 comprises at least a semi-transparent portion 45 and that the casing 30 comprises a camera 90 mounted inside the casing 30 as shown in particular in FIG. 13. The semi-transparent portion 45 of the mirror 40 allows viewing from inside the mirror 40 to the outside of the mirror 40. The camera 90 can also be mounted in the rear-view device 10 of FIG. 1. Advantageously, the camera 90 is securely mounted with the casing 30 thanks to the fact that the casing 30 is the one rotating on the three rotation axes R, S, T and not the mirror 40 like the state of the prior art.

The invention thus conceived is susceptible to many modifications and variants, all falling within the same inventive concept; furthermore, all details can be replaced by equivalent technical elements. In practice, the materials used, as well as the dimensions thereof, can be of any type according to the technical requirements.

The invention claimed is:
1. A rear-view device for a vehicle comprising:
a support arm adapted to be securely mounted with said vehicle;
a casing rotatably mounted with said support arm; and
a mirror securely mounted with said casing,
said rear-view device for a vehicle further comprising:
a first electric motor securely mounted with said support arm, said first electric motor comprising a spindle adapted to rotate around a first geometric axis (R) with respect to said support arm;

a support frame, which is securely mounted with said spindle, said support frame adapted to rotate around said first geometric axis (R) switching from at least a first angular position to at least a second angular position; and a single actuator, which is mounted with said support frame, said actuator being securely mounted with said casing, said actuator adapted to rotate around a second geometric axis (S) and a third geometric axis (T), wherein said second geometric axis (S) is perpendicular to said third geometric axis (T), wherein said casing rotates around said first geometric axis (R), to said second geometric axis (S) and to said third geometric axis (T) switching from a plurality of angular positions with respect to said support arm.

2. The rear-view device according to claim 1, wherein said actuator is securely mounted with a support of said casing, wherein said support is securely mounted with said casing.

3. The rear-view device according to claim 2, wherein said support frame comprises a support and wherein said actuator is rotatably mounted with said support of said support frame, in such a way as to rotate both around said second geometric axis (S) and around said third geometric axis (T).

4. The rear-view device according to claim 3, wherein said support for said actuator comprises a hemispherical portion and a base portion, said hemispherical portion comprises at least a through opening adapted to allow an engagement between said actuator and said casing, said base portion comprises a wall adapted to be securely mounted with said support frame.

5. The rear-view device according to claim 1, wherein said support frame comprises a support and wherein said actuator is rotatably mounted with said support of said support frame, in such a way as to rotate both around said second geometric axis (S) and around said third geometric axis (T).

6. The rear-view device according to claim 5, wherein said support for said actuator comprises a hemispherical portion and a base portion, said hemispherical portion comprises at least a through opening adapted to allow an engagement between said actuator and said casing, said base portion comprises a wall adapted to be securely mounted with said support frame.

7. The rear-view device according to claim 6, wherein said support of said support frame is mounted in the opposite direction with respect to said mirror.

8. The rear-view device according to claim 5, wherein said support of said support frame is mounted in the opposite direction with respect to said mirror.

9. The rear-view device according to claim 1, wherein said support arm comprises a base support and wherein said first electric motor is securely mounted above said base support and said first geometric axis (R) is perpendicular to the base support.

10. The rear-view device according to claim 9, wherein said support arm comprises a base, a rod comprising a lower portion securely mounted with said base and a top portion forming said base support.

11. The rear-view device according to claim 1, wherein said third geometric axis (T) is parallel to said first geometric axis (R).

12. The rear-view device according to claim 1, wherein said casing comprises a lower portion comprising a through opening.

* * * * *